United States Patent
Watanabe

(10) Patent No.: US 7,813,009 B2
(45) Date of Patent: Oct. 12, 2010

(54) IMAGE SCANNING DEVICE AND IMAGE FORMING APPARATUS

(75) Inventor: Noboru Watanabe, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 503 days.

(21) Appl. No.: 11/987,965

(22) Filed: Dec. 6, 2007

(65) Prior Publication Data

US 2008/0137155 A1 Jun. 12, 2008

(30) Foreign Application Priority Data

Dec. 8, 2006 (JP) ............................. 2006-331374

(51) Int. Cl.
  *H04N 1/04* (2006.01)
  *H04N 1/40* (2006.01)
(52) U.S. Cl. ................ 358/461; 358/474; 358/496
(58) Field of Classification Search .............. 358/461, 358/474, 496, 498; 382/274, 318, 319, 312; 399/367
See application file for complete search history.

(56) References Cited

U.S. PATENT DOCUMENTS

| | | | | |
|---|---|---|---|---|
| 4,602,293 A | * | 7/1986 | Sekine | 358/461 |
| 4,806,775 A | * | 2/1989 | Uchida | 358/494 |
| 5,124,810 A | * | 6/1992 | Seto | 358/406 |
| 6,254,078 B1 | * | 7/2001 | Taruki | 271/3.01 |
| 6,995,877 B2 | * | 2/2006 | Suzuki | 358/474 |
| 7,110,148 B2 | * | 9/2006 | Hasegawa et al. | 358/474 |
| 2006/0256402 A1 | * | 11/2006 | Katayama | 358/474 |
| 2009/0284808 A1 | * | 11/2009 | Hamada et al. | 358/474 |

FOREIGN PATENT DOCUMENTS

| | | |
|---|---|---|
| JP | 2002-094711 | 3/2002 |
| JP | 2004-021227 | 1/2004 |
| JP | 2005-159482 | 6/2005 |

* cited by examiner

*Primary Examiner*—Cheukfan Lee
(74) *Attorney, Agent, or Firm*—Harness, Dickey & Pierce, P.L.C.

(57) ABSTRACT

A disclosed image scanning device includes a scanning unit configured to scan a document, and a white standard plate facing the scanning unit and configured to provide a white standard at the time of scanning the original. The white standard plate includes a guide plate having a plate-like shape fabricated by performing press work, where the guide plate faces the scanning unit; and a reinforcing member having a U-shape with bent ends fabricated by performing press work, where the bent ends are welded onto a back side of the guide plate.

7 Claims, 4 Drawing Sheets

IMAGE SCANNING DEVICE AND IMAGE FORMING APPARATUS

BACKGROUND OF THE INVENTION

1. Field of the Invention

The present invention relates to an image scanning device included in an image forming apparatus such as a copier, a facsimile machine, and a printer.

2. Description of the Related Art

Conventionally, in image scanning devices, light is irradiated to a white standard plate disposed opposite to a scanning unit, and the light reflected from the white standard plate is received to acquire shading data indicating the white density at the time of scanning an original. Based on this shading data, shading correction is performed. In performing shading correction, it is important that the corrected values be uniform in the width direction of the original. Accordingly, it is preferable that the white standard plate be highly flat so that the distance from the scanning unit to the standard white plate varies within a predetermined range. There are white standard plates that are fabricated by performing press work on sheet metal and adhering white seals or applying a white coating on their surfaces, which white standard plates are low-cost and widely used.

However, in an image scanning device that is wide enough to accommodate the width of an A0-sized sheet (the width of an A0-sized sheet is 841 mm), the white standard plate, which is formed by performing press work on sheet metal, may sag in its longitudinal direction. Thus, it is difficult to maintain the high flatness of the white standard plate. The white standard plate needs to have high rigidity in order to increase its flatness, so that the white standard plate is prevented from sagging as much as possible.

A method of fabricating a highly rigid white standard plate is disclosed in patent document 1. Specifically, a member made of aluminum alloy, which is extruded from a die, is used to form a white standard plate having a box-like shape that has high rigidity.

Patent Document 1: Japanese Laid-Open Patent Application No. 2005-159482

However, in order to fabricate a white standard plate by extruding aluminum alloy, expensive materials and costly processes are required, which lead to increased costs. Furthermore, the board may become curved or twisted, which are typical features of extrusion processing. Hence, additional processes are necessary for correcting such deformations, which lead to even higher costs.

SUMMARY OF THE INVENTION

The present invention provides an image scanning device and an image forming apparatus in which one or more of the above-described disadvantages are eliminated.

A preferred embodiment of the present invention provides an image scanning device including a low-cost white standard plate that is highly flat despite being long and an image forming apparatus including the same.

An embodiment of the present invention provides an image scanning device including a scanning unit configured to scan a document; and a white standard plate facing the scanning unit and configured to provide a white standard at the time of scanning the original, the white standard plate including a guide plate having a plate-like shape fabricated by performing press work, wherein the guide plate faces the scanning unit; and a reinforcing member having a U-shape with bent ends fabricated by performing press work, wherein the bent ends are welded onto a back side of the guide plate.

An embodiment of the present invention provides an image forming apparatus including an image scanning device, wherein the image scanning device includes a scanning unit configured to scan a document; and a white standard plate facing the scanning unit and configured to provide a white standard at the time of scanning the original, the white standard plate including a guide plate having a plate-like shape fabricated by performing press work, wherein the guide plate faces the scanning unit; and a reinforcing member having a U-shape with bent ends fabricated by performing press work, wherein the bent ends are welded onto a back side of the guide plate.

According to one embodiment of the present invention, an image scanning device is provided, which includes a low-cost white standard plate that is highly flat despite being wide.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

Figure 1:
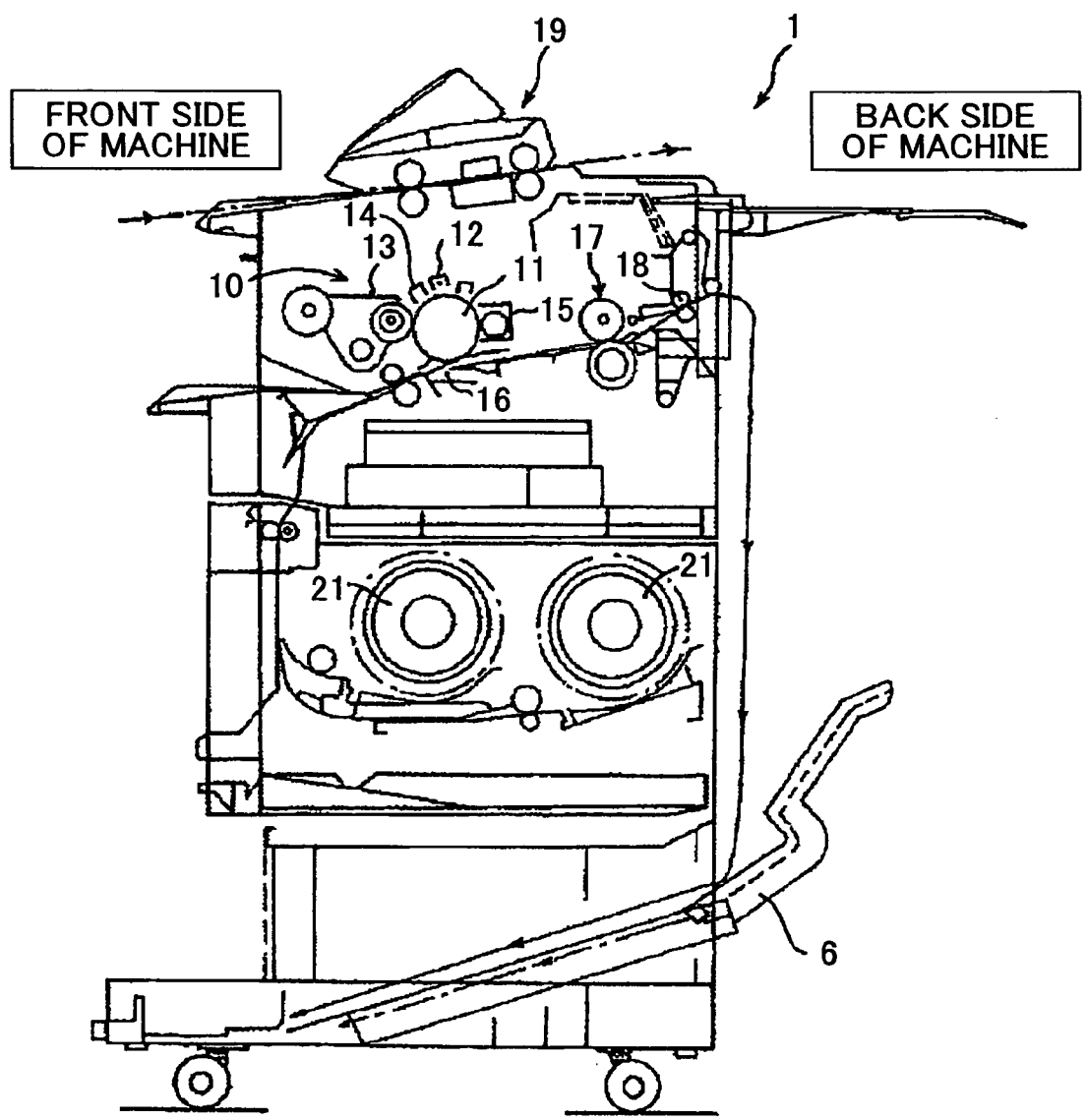
FIG. 1 is a schematic diagram of an image forming apparatus including an image scanning device according to an embodiment of the present invention.

FIG. 1 is a schematic diagram of an image forming apparatus including an image scanning device according to an embodiment of the present invention.

The image forming apparatus shown in FIG. 1 includes an image forming unit 10. The image forming unit 10 includes a drum-type photoconductor 11 surrounded by a charging device 12, an exposing device 14, a developing device 13, a transfer device 16, a cleaning device 15, etc. At a downstream position with respect to the image forming unit 10, a fixing device 17 is provided, which includes a fixing roller with a built-in heater and a pressurizing roller for pushing the fixing roller from beneath. At a downstream position with respect to the fixing device 17, a pair of eject rollers 18 for ejecting a recording body outside of the apparatus is provided, which recording body has an image formed thereon. Beneath the image forming unit 10, roller-type sheet feeding units 21 are provided for conveying a sheet up to the image forming unit 10 at a predetermined timing. Furthermore, a sheet tray 6 is provided at the bottom part of the apparatus body for accommodating sheets onto which images have been formed.

In such an image forming apparatus, the photoconductor 11 is rotated, and uniformly charged by the charging device 12. Next, light is irradiated by the exposing device 14 according to image data scanned by an image scanning device 19, thereby forming an electrostatic latent image. The electrostatic latent image on the photoconductor 11 is developed by the developing device 13. The developed image is then transferred by the transfer device 16 onto a recording body that is conveyed at a predetermined timing by the sheet feeding units 21. After the transfer operation, the recording body is conveyed to the fixing device 17, where the image is fixed onto the recording body with heat and pressure. After the fixing operation, the recording body is caused to pass through the pair of eject rollers 18, be ejected outside of the apparatus, caused to descend along the back side of the machine, and is put in the sheet tray 6.

Next, a description is given of the image scanning device 19.

Figure 2:
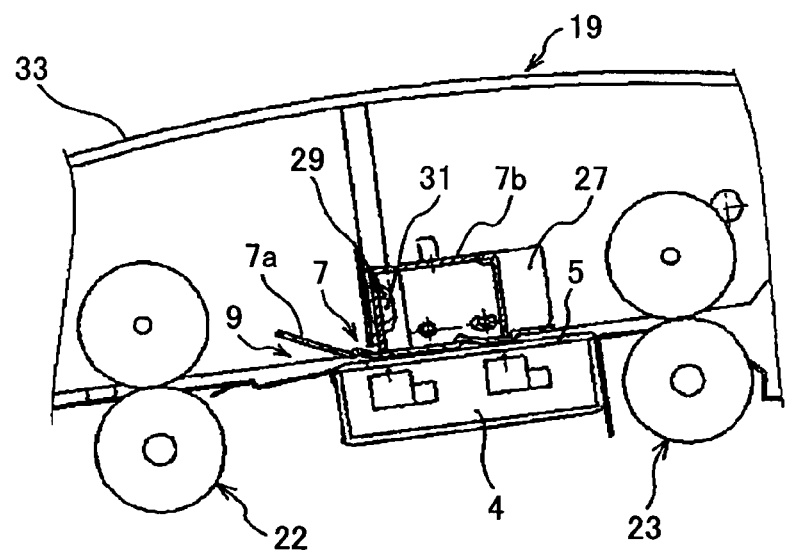
FIG. 2 is a schematic diagram of the image scanning device according to an embodiment of the present invention.

FIG. 2 is a schematic diagram of the image scanning device 19. The image scanning device 19 includes an original scanning unit 9, pairs of conveying rollers 22, 23, which are provided at the front and back, respectively, of the image scanning device 19 to act as a conveying unit for conveying an original toward the front or the back of the machine, and an original conveying cover 33. The original scanning unit 9 includes a contact-type image sensor 4 acting as a scanning unit and a white standard plate 7 arranged at a position opposite to the contact-type image sensor 4 across an original conveying path, which white standard plate 7 is to be used when scanning an original.

Figure 3:
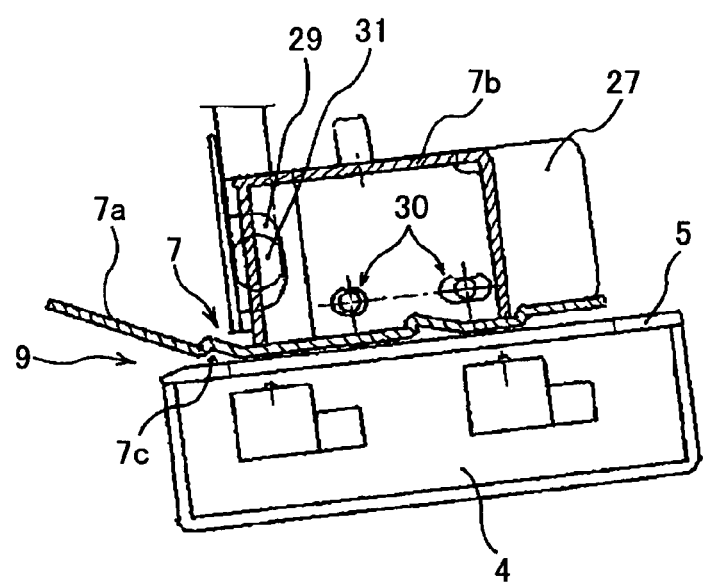
FIG. 3 is an enlarged view of the original scanning unit.

FIG. 3 is an enlarged view of the original scanning unit 9. The contact-type image sensor 4 has a contact glass 5 mounted on its top surface. The contact-type image sensor 4 irradiates light onto an original being conveyed to a scanning position on the contact glass 5. Photoelectric conversion is performed on the light reflected from the original. In this manner, an image is scanned from a side of the original facing the contact glass 5 (original surface).

The white standard plate 7 includes a guide plate 7a formed by performing press work on sheet metal; the guide plate 7a is welded to bent ends of a reinforcing member 7b that is bent in such a manner as to form a U-shape by performing press work on sheet metal. The sections where the guide plate 7a and the reinforcing member 7b are joined are positioned opposite to scanning lines of the contact-type image sensor 4. If the guide plate 7a alone is provided, its rigidity will be low. However, in the above manner, the guide plate 7a is reinforced by having its back side joined to the bent ends of the reinforcing member 7b that is bent to have a highly-rigid U-shape. Therefore, the white standard plate 7 is made rigid despite being long. Furthermore, the joined sections are welded together, and therefore the strength can be increased. Compared to the case of using an adhesive or screws to join the members, the method of welding the members together is more advantageous because multiple points can be reliably joined together within a short period of time. Moreover, by automating the welding operation, multiple points can be reliably joined together within an even shorter period of time. In comparison, the use of an adhesive would require time for fixation in order to reliably adhere together the guide plate 7a and the ends of the reinforcing member 7b, which would lead to increased costs. The use of screws would require longer assembling time because many points need to be screwed together, which would also lead to increased costs. Thus, it is possible to reduce costs by welding together members to form the white standard plate having the above-described shape, which members are fabricated by performing press work on sheet metal. On the other side of the guide plate 7a, which is not facing (not joined to) the reinforcing member 7b, a white tape is adhered to provide a white standard.

The white standard plate 7 is held by a holding unit 27 that is substantially a cuboid. Elongated holes 29 are formed at both ends of the holding unit 27 in the longitudinal direction. Shafts 31, which hang down from the original conveying cover 33, are engaged with the elongated holes 29, in such a manner that the holding unit 27 is arranged at a predetermined position. Furthermore, not-shown spacer components are provided at both edges of the contact glass 5 in the width direction of the original, in such a manner that a predetermined space is formed in the original conveying path between the guide plate 7a of the white standard plate 7 and the contact glass 5. By forming a predetermined space in the original conveying path between the white standard plate 7 and the contact glass 5 in this manner, the white standard plate 7 is also made to have a function of holding down an original.

Light is irradiated to the white standard plate 7, and the light reflected from the white standard plate 7 is received to acquire shading data, which shading data correspond to the white density at the time of scanning an original and act as a reference for density irregularities. Based on this shading data, shading correction is performed. In performing shading correction, it is important that the corrected values be uniform in the width direction of an original being conveyed. Therefore, it is preferable that the scanning surface of the white standard plate 7 be flat so that the distance from the scanning unit to the white standard plate 7 varies within a predetermined range. By using the highly rigid white standard plate 7 with the above-described configuration, the white standard plate 7 can be prevented from sagging as much as possible so that high flatness is achieved.

The portions at which the holding unit 27 holds the white standard plate 7 are fixed to elongated holes 30 provided in the holding unit 27, in such a manner that the fixing position of the white standard plate 7 can be adjusted to move forward or backward. If microscopic scratches are formed or soiling occurs due to foreign matter at the scanning line positions on the white surface of the white standard plate 7, it will not be possible to acquire appropriate shading data, which may lead to degraded image quality. In such a case, the position of the white standard plate 7 is adjusted to move forward or backward with the use of the elongated holes 30. Accordingly, the portions with the scratches and foreign matter are shifted away from the scanning lines, so that accurate shading data can be acquired. With such a configuration, it is possible to reduce the frequency of discarding the white standard plate 7 due to microscopic scratches and foreign matter, which leads to improved cost performance.

Furthermore, as shown in FIG. 3, it is preferable that a white seal member be adhered to the surface of the guide plate 7a facing the contact-type image sensor 4, and that the guide plate 7a to which the seal member is adhered forms a concave shape 7c at the side at which originals are inserted. Accordingly, the original is prevented from being caught by the edge of one of the seal members. The reason why the guide plate 7a includes two concave shapes as shown in FIG. 3 is that two seal members are adhered one at each the front and the back. Each seal member is reduced in size (the length in the sheet conveyance direction is reduced). This mitigates the difficulty in adhering the seal members to the guide plate 7a.

Figure 6:
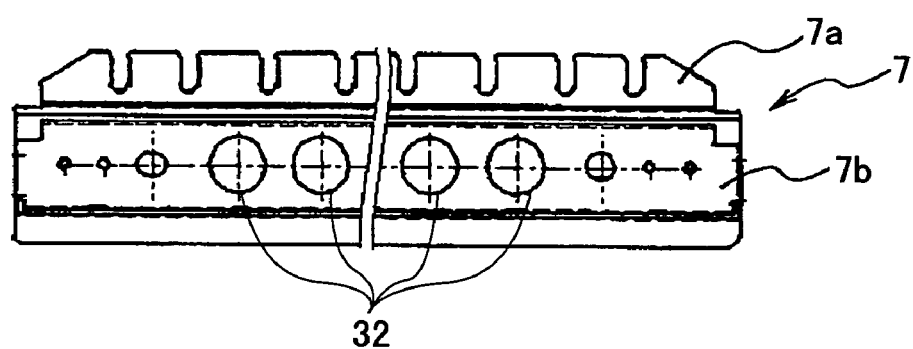
FIG. 6 is a top view of a white standard plate.

FIG. 6 is a top view of the white standard plate 7. Lightening holes 32 are provided on the top surface (back side) of the guide plate 7a of the white standard plate 7, so that the weight of the white standard plate 7 is reduced.

Figure 7:
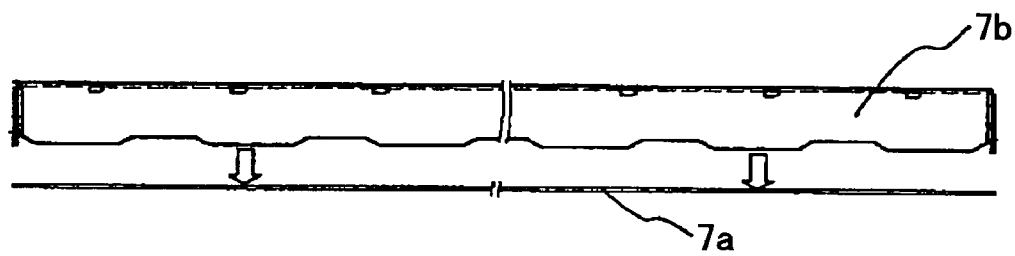
FIG. 7 illustrates the portions where a reinforcing member and a guide plate of the white standard plate are joined.

FIG. 7 illustrates the portions where the reinforcing member 7b and the guide plate 7a of the white standard plate 7 are joined. As shown in FIG. 7, the bent ends of the reinforcing member 7b have concavities and convexities. Only the convexities are subjected to an additional cutting process, thereby improving the straightness accuracy of the convexities of the bent ends. Then, the guide plate 7a is joined to the convexities of the bent ends of the reinforcing member 7b. This mitigates the difficulty in performing the process to improve the straightness accuracy along the entire bent end of the reinforcing member 7b, so that the flatness of the guide plate 7a is increased.

Furthermore, the material used for the guide plate 7a is thinner than that used for the reinforcing member 7b. Therefore, the plane of the guide plate 7a will follow the straight shape of the bent ends of the reinforcing member 7b, so that a flat plane is formed. This increases the flatness of the guide plate 7a.

Figure 4:
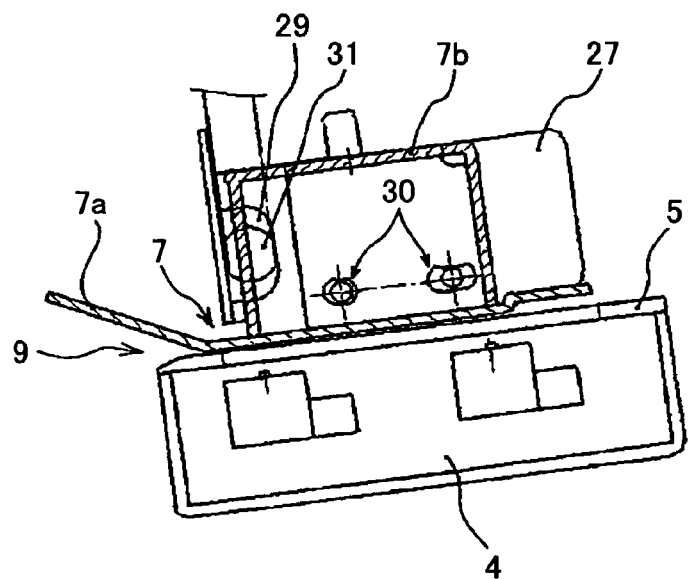
FIG. 4 is a schematic diagram of a modification of the original scanning unit.

FIG. 4 is a schematic diagram of a modification of the original scanning unit 9. In the example shown in FIG. 4, the surface of the guide plate 7a of the white standard plate 7 facing the contact-type image sensor 4 has a white coating applied thereon, so as to provide a white standard. Because a coating is used instead of tape, there is no need to be concerned about the sheet being caught by the tape. Therefore, the guide plate 7a is made to be flat, without including any concave shapes.

Figure 5:
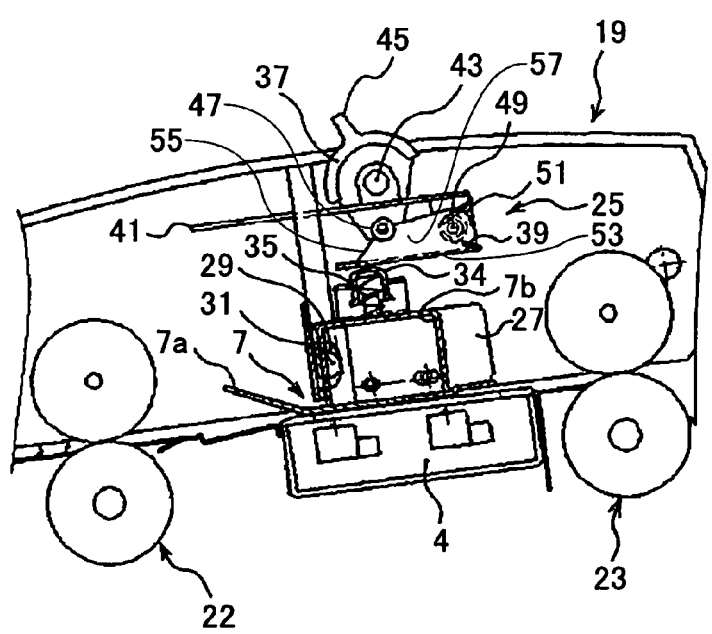
FIG. 5 is a schematic diagram of another modification of the original scanning unit.

FIG. 5 is a schematic diagram of another modification of the original scanning unit 9. Above the white standard plate 7, there is provided an adjusting unit 25 for adjusting the pressing force of the white standard plate 7 with respect to an original. A compression spring 35 is provided above the holding unit 27. A receiving member 34 is fixed to the top end of the compression spring 35, and the compression spring 35 is biased as the receiving member 34 receives a force, so that the white standard plate 7 is strongly pressed from above.

The adjusting unit 25 includes a right/left lever (operating member) 37 positioned above the original conveying cover 33 and a bracket 39 for applying a force to the receiving member 34 by being operated by the lever 37. The lever 37 and the bracket 39 are mounted on the same fixing plate 41.

The lever 37 includes a rotational shaft 43 that is rotatably mounted on the fixing plate 41, a tab 45 for operating the lever 37, and a movable member 47 to be moved forward and backward as the tab 45 is operated. The bracket 39 provided beneath the fixing plate 41 includes a rotational shaft 49 that is rotatably mounted on the fixing plate 41, a spring 51 wound around the rotational shaft 49 for biasing the bracket 39 upward, and a pressing plate 53 that moves downward contrary to the biasing force of the spring 51 and comes in contact with the receiving member 34. The bracket 39 includes an oblique portion 55 that extends obliquely upward toward the front of the machine and a recessed portion 57 formed above the oblique portion 55. By moving the tab 45 from the back of the machine toward the front of the machine as shown in FIG. 5, the movable member 47 rises along the oblique portion 55 and the bracket 39 is pressed downward. As the movable member 47 engages with the recessed portion 57, the pressing plate 53 presses the compression spring 35 so that a predetermined pressing force is applied on the white standard plate 7. By moving the tab 45 toward the back of the machine, the movable member 47 is disengaged from the recessed portion 57.

As described above, the white standard plate 7 shown in FIG. 5 is provided with the adjusting unit 25 for adjusting the pressing force applied to an original. Therefore, it is possible to adjust the pressing force applied by the white standard plate 7 onto an original based on the type of the original. In the case of special originals other than regular ones, such as a thick original or a folded original, a larger pressing force is applied from the white standard plate 7 onto the original. Accordingly, it is possible to prevent the white standard plate 7 from being moved upward by being pressed by the ridged portion of the folded original. Hence, the space between the white standard plate 7 and the original scanning surface can be maintained at a constant size, and therefore the original can be scanned in an optimal manner and good-quality images can be acquired. The white standard plate 7 is configured to maintain high rigidity, and therefore the white standard plate 7 can maintain a certain flatness without sagging.

In the above embodiment, the contact-type image sensor 4 is used as the scanning unit; however, the scanning unit is not limited thereto. For example, a reduction optical system can be used. In FIGS. 2, 3, 4, and 5, it is assumed that short contact-type sensors, each having a width equivalent to that of an A4-sized sheet, are arranged in a staggered (zigzag) manner; however, a single contact-type image sensor can be used.

As described above, the white standard plate 7 is formed by welding together the guide plate 7a and the reinforcing member 7b. The guide plate 7a is fabricated by performing press work on sheet metal. The reinforcing member 7b is fabricated by performing press work on sheet metal in such a manner as to be bent into a U-shape. If the guide plate 7a alone is provided, the rigidity thereof will be low. However, in the above manner, the guide plate 7a is reinforced by having its back side welded to the bent ends of the reinforcing member 7b that is bent to have a highly-rigid U-shape. Therefore, the white standard plate 7 can be made rigid despite being long. The white standard plate 7 is formed by welding together members that have been fabricated by performing press work on sheet metal, and is therefore formed at low cost.

The bent ends of the reinforcing member 7b have concavities and convexities. Only the convexities are subjected to an additional cutting process, thereby improving the straightness accuracy of the convexities of the bent ends. Then, the guide plate 7a is joined to the convexities of the bent ends of the reinforcing member 7b. This mitigates the difficulty in performing the process to improve the straightness accuracy along the entire bent end of the reinforcing member 7b so that the flatness of the guide plate 7a is increased.

The portions where the guide plate 7a and the reinforcing member 7b are joined are made to face the portions near the scanning lines of the contact-type image sensor 4. The plane of the guide plate 7a will follow the straight shape of the bent ends of the reinforcing member 7b. Therefore, the portions above the scanning lines will be highly flat, so that shading correction is reliably performed.

Furthermore, lightening holes are provided on the top surface (back side) of the guide plate 7a, so that the weight of the white standard plate 7 is made lighter.

Moreover, the material used for the guide plate 7a is thinner than that used for the reinforcing member 7b, and therefore the plane of the guide plate 7a will follow the straight shape of the bent ends of the reinforcing member 7b, so that a flat plane is formed. This increases the flatness of the guide plate 7a.

Furthermore, a white seal member is adhered to the surface of the guide plate 7a facing the contact-type image sensor 4, so that the white standard plate 7 provides a white standard. The guide plate 7a forms the concave shape 7c at the side where originals are inserted. Accordingly, the original is prevented from being caught by the edge of one of the seal members.

According to one embodiment of the present invention, an image scanning device includes a scanning unit configured to scan an original; and a white standard plate facing the scanning unit and configured to provide a white standard at the time of scanning the original, the white standard plate including a guide plate having a plate-like shape fabricated by performing press work, wherein the guide plate faces the scanning unit; and a reinforcing member having a U-shape with bent ends fabricated by performing press work, wherein the bent ends are welded onto a back side of the guide plate.

Further, according to one embodiment of the present invention, in the above image scanning device, the bent ends of the reinforcing member include concavities and convexities; and the convexities are welded to the guide plate.

Further, according to one embodiment of the present invention, in the above image scanning device, portions of the white standard plate at which the guide plate is welded to the reinforcing member are arranged near locations facing scanning positions of the scanning unit.

Further, according to one embodiment of the present invention, in the above image scanning device, holes are provided on a back side of the reinforcing member.

Further, according to one embodiment of the present invention, in the above image scanning device, the guide plate has a thickness that is less than that of the reinforcing member.

Further, according to one embodiment of the present invention, in the above image scanning device, a white seal member is adhered on a side of the guide plate facing the scanning unit to thereby provide the white standard; and the guide plate includes a concave shape at a side where the original is inserted.

According to one embodiment of the present invention, a guide plate is reinforced by having its back side joined to bent ends of a reinforcing member that is bent to have a highly-rigid U-shape, which guide plate would otherwise have low rigidity if provided alone. Therefore, a white standard plate is made rigid and highly flat despite being long. Furthermore, the joined sections are welded together, and therefore the strength can be increased. Compared to the case of using an adhesive or screws to join the members, the method of welding the members together is more advantageous because multiple points can be reliably joined together within a short period of time. Thus, it is possible to reduce costs by welding together members to form the white standard plate having the above-described shape, which members are fabricated by performing press work on sheet metal.

The present invention is not limited to the specifically disclosed embodiment, and variations and modifications may be made without departing from the scope of the present invention.

The present application is based on Japanese Priority Patent Application No. 2006-331374, filed on Dec. 8, 2006, the entire contents of which are hereby incorporated by reference.

What is claimed is:

1. An image scanning device comprising:
a scanning unit configured to scan an original; and
a white standard plate facing the scanning unit and configured to provide a white standard at the time of scanning the original, the white standard plate comprising:
a guide plate having a plate-like shape fabricated by performing press work, wherein the guide plate faces the scanning unit; and
a reinforcing member having a U-shape with bent ends fabricated by performing press work, wherein the bent ends are welded onto a back side of the guide plate.

2. The image scanning device according to claim 1, wherein:
the bent ends of the reinforcing member comprise concavities and convexities; and
the convexities are welded to the guide plate.

3. The image scanning device according to claim 1, wherein:
portions of the white standard plate at which the guide plate is welded to the reinforcing member are arranged near locations facing scanning positions of the scanning unit.

4. The image scanning device according to claim 1, wherein:
holes are provided on a back side of the reinforcing member.

5. The image scanning device according to claim 1, wherein:
the guide plate has a thickness that is less than that of the reinforcing member.

6. The image scanning device according to claim 1, wherein:
a white seal member is adhered on a side of the guide plate facing the scanning unit to thereby provide the white standard; and
the guide plate comprises a concave shape at a side where the original is inserted.

7. An image forming apparatus comprising an image scanning device, wherein the image scanning device comprises:
a scanning unit configured to scan an original; and
a white standard plate facing the scanning unit and configured to provide a white standard at the time of scanning the original, the white standard plate comprising:
a guide plate having a plate-like shape fabricated by performing press work, wherein the guide plate faces the scanning unit; and
a reinforcing member having a U-shape with bent ends fabricated by performing press work, wherein the bent ends are welded onto a back side of the guide plate.

* * * * *